US011010620B2

(12) United States Patent
Jo

(10) Patent No.: US 11,010,620 B2
(45) Date of Patent: *May 18, 2021

(54) SYSTEM AND METHOD OF COMPENSATING FOR POSITION OF VEHICLE, AND CAMERA MODULE

(71) Applicant: MANDO CORPORATION, Pyeongtaek-si (KR)

(72) Inventor: Min Gwan Jo, Seoul (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,374

(22) Filed: Dec. 30, 2019

(65) Prior Publication Data

US 2020/0242371 A1 Jul. 30, 2020

Related U.S. Application Data

(63) Continuation of application No. 16/658,031, filed on Oct. 19, 2019.

(30) Foreign Application Priority Data

Jan. 29, 2019 (KR) .......................... 10-2019-0011478

(51) Int. Cl.
*G06K 9/00* (2006.01)
*G06T 7/73* (2017.01)
*B60R 11/04* (2006.01)

(52) U.S. Cl.
CPC ............ *G06K 9/00798* (2013.01); *G06T 7/74* (2017.01); *B60R 11/04* (2013.01); *G06T 2207/30256* (2013.01)

(58) Field of Classification Search
CPC ......... G05D 2201/0213; G05D 1/0246; G06K 9/00798; G06K 9/00791; G08G 1/04;
(Continued)

(56) References Cited

U.S. PATENT DOCUMENTS 9,168,953 B2 10/2015 Mitsumoto et al.
2004/0164851 A1* 8/2004 Crawshaw ............. B60Q 9/008
340/435
(Continued)

FOREIGN PATENT DOCUMENTS

JP S57-047998 B2 7/2015
JP 2016-206868 A 12/2016
(Continued)

OTHER PUBLICATIONS

Office Action for Korean Application No. 10-2019-0011478 dated Mar. 29, 2019 and its translation by Applicant's foreign council.
(Continued)

*Primary Examiner* — Guillermo M Rivera-Martinez
(74) *Attorney, Agent, or Firm* — Morgan, Lewis & Bockius LLP

(57) ABSTRACT

The present disclosure relates to a system and a method of compensating for a position of a vehicle, and a camera module. More specifically, a system of compensating for the position of the vehicle of the present disclosure detects a front road-line and a rear road-line of a driving lane of the vehicle based on image data on the front and rear areas of the vehicle, determines an offset of a front road-line and an offset of a rear road-line based on the front road-line and the rear road-line of the driving lane of the vehicle, compares the offset of the front road-line with the offset of the rear road-line, and determines a final road-line offset of the vehicle according to the result of the comparison.

21 Claims, 12 Drawing Sheets

(58) Field of Classification Search
CPC ............. G06T 2207/30256; G06T 7/00; G06T 2207/30252
See application file for complete search history.

(56) References Cited

U.S. PATENT DOCUMENTS

| | | | | |
|---|---|---|---|---|
| 2007/0091173 | A1* | 4/2007 | Kade | G01S 5/16 348/119 |
| 2010/0082195 | A1* | 4/2010 | Lee | B62D 15/025 701/25 |
| 2010/0082203 | A1* | 4/2010 | Isaji | B60W 30/09 701/41 |
| 2012/0062747 | A1* | 3/2012 | Zeng | G06K 9/00798 348/149 |
| 2012/0212612 | A1* | 8/2012 | Imai | G06K 9/00798 348/148 |
| 2012/0327233 | A1* | 12/2012 | Imai | G08G 1/167 348/148 |
| 2013/0002871 | A1* | 1/2013 | Natroshvili | G06T 7/80 348/148 |
| 2013/0293717 | A1* | 11/2013 | Zhang | H04N 7/181 348/149 |
| 2014/0032108 | A1* | 1/2014 | Zeng | G08G 1/167 701/533 |
| 2014/0257640 | A1* | 9/2014 | Mitsumoto | B60W 30/10 701/41 |
| 2014/0379164 | A1* | 12/2014 | Joh | B60W 30/12 701/1 |
| 2016/0159395 | A1* | 6/2016 | Kim | B62D 15/025 701/41 |
| 2017/0008521 | A1* | 1/2017 | Braunstein | G08G 1/0112 |
| 2017/0147889 | A1* | 5/2017 | Okano | G06K 9/00798 |
| 2017/0364756 | A1* | 12/2017 | Liebau | G07C 5/08 |
| 2018/0134289 | A1* | 5/2018 | Kokido | B62D 15/025 |
| 2018/0365858 | A1* | 12/2018 | Kim | G06T 7/536 |
| 2018/0365859 | A1* | 12/2018 | Oba | G06T 7/80 |
| 2019/0035110 | A1* | 1/2019 | Shikimachi | G01C 21/3626 |
| 2019/0092340 | A1* | 3/2019 | Chundrlik, Jr. | B60W 50/0205 |
| 2019/0171896 | A1* | 6/2019 | Okada | G06K 9/6202 |
| 2019/0206060 | A1* | 7/2019 | Matsumoto | G06T 7/0002 |
| 2019/0362160 | A1* | 11/2019 | Torikura | B60R 11/02 |

FOREIGN PATENT DOCUMENTS

| | | |
|---|---|---|
| KR | 10-2016-0071168 A | 6/2016 |
| KR | 10-2018-0015018 A | 2/2018 |

OTHER PUBLICATIONS

Notice of Allowance for Korean Application No. 10-2019-0011478 dated Jul. 16, 2019 and its translation by Applicant's foreign council.

* cited by examiner

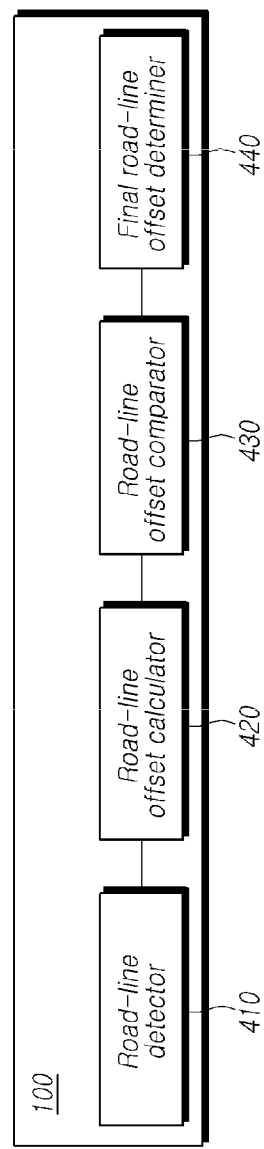

SYSTEM AND METHOD OF COMPENSATING FOR POSITION OF VEHICLE, AND CAMERA MODULE

CROSS REFERENCE TO RELATED APPLICATION

The present application is a continuation of U.S. patent application Ser. No. 16/658,031 filed on Oct. 19, 2019, which claims the benefit of priority to Korean Patent Application No. 10-2019-0011478 filed on Jan. 29, 2019 in the Korean Intellectual Property Office, the entire disclosure of which is hereby incorporated by reference.

TECHNICAL FIELD

The present disclosure relates to a system and a method of compensating for the position of a vehicle and a camera module and, more particularly, to a system, a method, and a device of compensating for the position of a vehicle using information on front and rear road-lines of a driving lane of the vehicle.

BACKGROUND

A vehicle is a device that a user on board moves in a desired direction. Typically, an example of the vehicle is a car. The vehicle may employ various functions of assisting the driver, such as a blind-spot detection (BSD) function, a lane-keeping assistance (LKA) function, an adaptive smart cruise control (ASCC) function, and the like. In addition thereto, in recent years, an autonomous driving function has been developed, which recognizes the environment around the vehicle and performs speed adjustment of the vehicle, lane keeping, route setting, parking, or the like, based on the recognized environment information of the vehicle.

A vehicle employing the autonomous driving function must identify the exact position of the vehicle during autonomous driving. The vehicle generally identifies the position of the vehicle using GPS information recognized by a GPS sensor inside the vehicle. Alternatively, the vehicle compensates for the GPS-based vehicle position using a camera (i.e., a front camera) that takes a photograph in the driving direction of the vehicle in order to reduce GPS noise.

However, in the case where the position of the vehicle is determined using the front camera to compensate for the GPS noise, an error in compensating for the position becomes higher due to misrecognition or erroneous recognition of road-lines in the multi-angled curved section or in the section where the lane width changes because of the limitation of an angle of view of the front camera.

SUMMARY

In the background above, the present disclosure is intended to recognize front and rear road-lines of a driving lane of a vehicle using at least front and rear cameras of the vehicle, determine road-line offsets of the vehicle using road-line offsets for the recognized front and rear road-lines, and compensate for the position of the vehicle using the determined road-line offsets.

According to an aspect, the present disclosure provides a system of compensating for a position of a vehicle, which includes: one or more image acquisition devices disposed on the vehicle so as to have fields of view of a front area and a rear area of the vehicle, respectively, and configured to capture image data and process the captured image data; and a controller configured to perform control at least based on the processed image data. The controller includes: a road-line detector configured to, based on image data on the front and rear area of the vehicle, which is processed by the one or more image acquisition devices, detect a front road-line and a rear road-line of a driving lane of the vehicle; a road-line offset calculator configured to, based on front road-line and the rear road-line of the driving lane of the vehicle, determine an offset of the front road-line and an offset of the rear road-line; a road-line offset comparator configured to compare the offset of the front road-line with the offset of the rear road-line; and a final road-line offset determiner configured determine a final road-line offset of the vehicle according to a result of the comparison.

According to another aspect, the present disclosure provides a system of compensating for a position of a vehicle, which includes: one or more image acquisition devices disposed on the vehicle so as to have fields of view of a front area and a rear area of the vehicle, respectively, and configured to capture image data and process the captured image data; one or more non-image acquisition devices disposed on the vehicle so as to have a field of sensing an interior or exterior of the vehicle and configured to capture sensing data and process the captured sensing data; and a controller including one or more processors configured toperform control at least based on the processed image data and the sensing data. The controller includes: a road-line detector configured to, based on at least one piece of the image data on the front and rear areas of the vehicle, which is processed by the one or more image acquisition devices, or the sensing data on the vehicle, which is processed by the one or more non-image acquisition devices, detect a front road-line and a rear road-line of a driving lane of the vehicle; a road-line offset calculator configured to, based on front road-line and the rear road-line of the driving lane of the vehicle, determine an offset of the front road-line and an offset of the rear road-line; a road-line offset comparator configured to compare the offset of the front road-line with the offset of the rear road-line; and a final road-line offset determiner configured to determine a final road-line offset of the vehicle according to the result of the comparison.

According to another aspect, the present disclosure provides a system of compensating for a position of a vehicle, which includes: one or more image acquisition devices disposed on the vehicle so as to have fields of view of the front area, the rear area, and optionally, the side area of the vehicle, respectively, and configured to capture image data; one or more non-image acquisition devices disposed on the vehicle so as to have a field of sensing the interior or exterior of the vehicle and configured to capture sensing data; and a domain control unit configured to process the image data captured by the one or more image acquisition devices and the sensing data captured by the one or more non-image acquisition devices, wherein the domain control unit is configured to: based on at least one piece of the image data on the front and rear areas of the vehicle and the sensing data on the vehicle, detect a front road-line and a rear road-line of a driving lane of the vehicle; based on the front road-line and the rear road-line of the driving lane of the vehicle, determine an offset of the front road-line and an offset of the rear road-line; compare the offset of the front road-line with the offset of the rear road-line; and determine a final road-line offset of the vehicle according to a result of the comparison.

According to another aspect, the present disclosure provides a method of compensating for a position of a vehicle, which includes: detecting a front road-line and a rear road-line of a driving lane of the vehicle; based on the front road-line and the rear road-line of the driving lane of the vehicle, calculating an offset of the front road-line and an offset of the rear road-line; comparing the offset of the front road-line with the offset of the rear road-line; and determining a final road-line offset of the vehicle according to a result of the comparison.

According to another aspect, the present disclosure provides a camera module including: an image sensor disposed on a vehicle so as to have a field of view of the exterior or interior of the vehicle and configured to capture image data; and a processor configured to process the image data captured by the image sensor, wherein the image data is used to detect a front road-line and a rear road-line of a driving lane of the vehicle, and wherein an offset of the front road-line and an offset of the rear road-line are determined based on the detected front road-line and rear road-line of the driving lane of the vehicle, the offset of the front road-line and the offset of the rear road-line are compared with each other, and a final road-line offset of the vehicle is determined according to a result of the comparison.

As described above, according to the present disclosure, since a system, a method, and a device of compensating for the position of a vehicle can recognize front and rear road-lines of a driving lane of the vehicle using a front camera and a rear camera, which are provided in the vehicle, and can determine road-line offsets using front and rear road-line information, it is possible to improve accuracy of the road-line offset in the multi-angled curved section or in the section where the lane width changes, thereby precisely compensating for the position of the vehicle. As a result, the driving stability of the vehicle can be improved.

BRIEF DESCRIPTION OF THE DRAWINGS

The above and other aspects, features, and advantages of the present disclosure will be more apparent from the following detailed description taken in conjunction with the accompanying drawings, in which:

FIG. 4 is a diagram illustrating configuration of a controller of a system of compensating for a position of a vehicle according to an embodiment of the present disclosure;

DETAILED DESCRIPTION OF THE EXEMPLARY EMBODIMENTS

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

A vehicle in the present specification may include a car, a motorcycle, and the like. Further, the vehicle may encompass all of an internal combustion engine vehicle having an engine as a power source, a hybrid vehicle having an engine and an electric motor as a power source, and an electric vehicle having an electric motor as a power source. Hereinafter, a description will be made of a car as the vehicle.

In the following description, "the front" means a forward driving direction of the vehicle, and "the rear" means a backward driving direction of the vehicle. In addition, "the left side" of the vehicle means the left side with respect to the forward driving direction of the vehicle, and "the right side" of the vehicle means the right side with respect to the forward driving direction of the vehicle. Further, "the left rear or the right rear" of the vehicle means the left side or the right side with respect to the backward driving direction of the vehicle.

Figure 1:
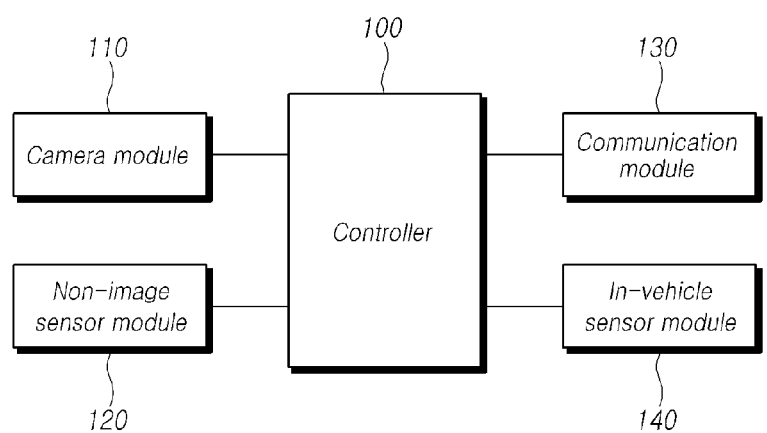
FIG. 1 is a block diagram of a vehicle according to an embodiment.

FIG. 1 is a block diagram of a vehicle according to an embodiment.

Referring to FIG. 1, a vehicle may be configured to include a controller 100, one or more image acquisition device(s) 110 (e.g., a camera module, etc.), one or more non-image acquisition device(s) 120, a communication module 130, and an in-vehicle sensor module 140.

For example, the camera module 110 may include an image sensor configured to have a field of view of the interior or exterior of the vehicle, thereby capturing image data, and a processor for processing the captured image data.

For example, the image sensor may be disposed on the vehicle so as to have a field of view of the interior or exterior of the vehicle. One or more image sensors may be mounted in respective portions of the vehicle so as to have fields of view of the front area, the side area, or the rear area of the vehicle.

Since the image information captured by the image sensor includes image data, it may mean image data captured by the image sensor. Hereinafter, the image information captured by the image sensor means image data captured by the image sensor in the present disclosure. The image data captured by the image sensor may be created in a format of, for example, AVI, MPEG-4, H.264, DivX, or JPEG in a raw form.

The image data captured by the image sensor may be processed by the processor. The processor may operate to process the image data captured by the image sensor.

The processor, in terms of hardware, may be implemented using at least one of electrical units, such as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, and the like, which can perform processing of image data and other functions.

Meanwhile, the non-image sensor modules 120 mean sensor modules other than the camera module 110 for capturing an image. For example, a plurality of non-image sensor modules 120 may be disposed on the vehicle so as to have fields of sensing the interior or exterior of the vehicle, thereby capturing sensing data. A plurality of non-image sensor modules 120 may include radar sensor, lidar sensors, ultrasonic sensors, and the like. The non-image sensor module 120 may not be provided, or one or more non-image sensor modules 120 may be provided.

The communication module 130 performs functions of communication between a vehicle and a vehicle, a vehicle and an infrastructure, a vehicle and a server, and components inside the vehicle. To this end, the communication module 130 may include a transmitting module and a receiving module. For example, the communication module 130 may include a broadcast receiving module, a wireless Internet module, a short-range communication module, a position information module, an optical communication module, and a V2X communication module.

The broadcast receiving module receives a broadcast signal or broadcast-related information from an external broadcast management server through a broadcast channel. Here, the broadcast includes at least one of a radio broadcast and a TV broadcast. A wireless Internet module refers to a module for wireless Internet access, which may be provided inside or outside the vehicle. The short-range communication module may support short-range communication using at least one of technologies such as Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, and Wireless Universal Serial Bus (Wireless USB).

The position information module is intended for acquiring position information of the vehicle, and a representative example thereof is a Global Positioning System (GPS) module. For example, the vehicle may acquire the position of the vehicle by the GPS module using signals transmitted from GPS satellites. Meanwhile, according to an embodiment, the position information module may be a component included in the in-vehicle sensor module 140, instead of a component included in the communication module 130.

The optical communication module may include a light emitter and a light receiver. The light emitter and the light receiver may convert light signals into electric signals to thus transmit and receive information.

The V2X communication module performs wireless communication with a server, another vehicle, or an infrastructure device. The V2X communication module in the present embodiment means that a vehicle exchanges information with other vehicles, mobile devices, things on the road, or the like through a wired/wireless network, or means the technique thereof. The V2X communication module may include concepts such as Vehicle-to-Vehicle (V2V) communication, Vehicle-to-Infrastructure (V2I) communication, Vehicle-to-Nomadic device (V2N) communication, Vehicle-to-Pedestrian (V2P) communication, and so on. The V2X communication module, based on Dedicated Short-Range Communications (DSRC), may use Wireless Access in Vehicular Environment (WAVE), which has recently been adopted by Institute of Electrical and Electronics Engineers (IEEE), or a communication technique of IEEE 802.11p using a band of 5.9 GHz, but it is not limited thereto, and it must be understood that all of the communication techniques between vehicles, which are being developed now, or will be developed in the future, are included therein.

The in-vehicle sensor module 140 refers to a sensor for sensing internal vehicle information. For example, the in-vehicle sensor module 140 may refer to a torque sensor for sensing a steering torque, a steering angle sensor for sensing a steering angle, a motor position sensor for sensing information on a steering motor, a vehicle speed sensor, a vehicle movement sensor for sensing the movement of a vehicle, a vehicle posture sensor, and the like. In addition, the in-vehicle sensor module 140 may refer to a sensor for sensing a variety of data inside the vehicle, and may include one or more sensors.

The controller 100 may obtain data from at least one of the camera module 110, the non-image sensor module 120, the communication module 130, and the in-vehicle sensor module 140, and may control various operations of the vehicle based on the obtained data. Alternatively, the controller 100 may obtain image data from the camera module 110, thereby processing the image data. In addition, the controller 100 may receive sensing data from the non-image sensor module 120, thereby processing the sensing data. Alternatively, the controller 100 may obtain data from the in-vehicle sensor module 140 or the communication module 130, thereby processing the data. For the processing, the controller 100 may include at least one processor.

In addition, the controller 100 may control the operation of at least one of the camera module 110, the non-image sensor module 120, the communication module 130, and the in-vehicle sensor module 140. The controller 100 may control the operations of various driver assistance systems provided in the vehicle.

Figure 2:
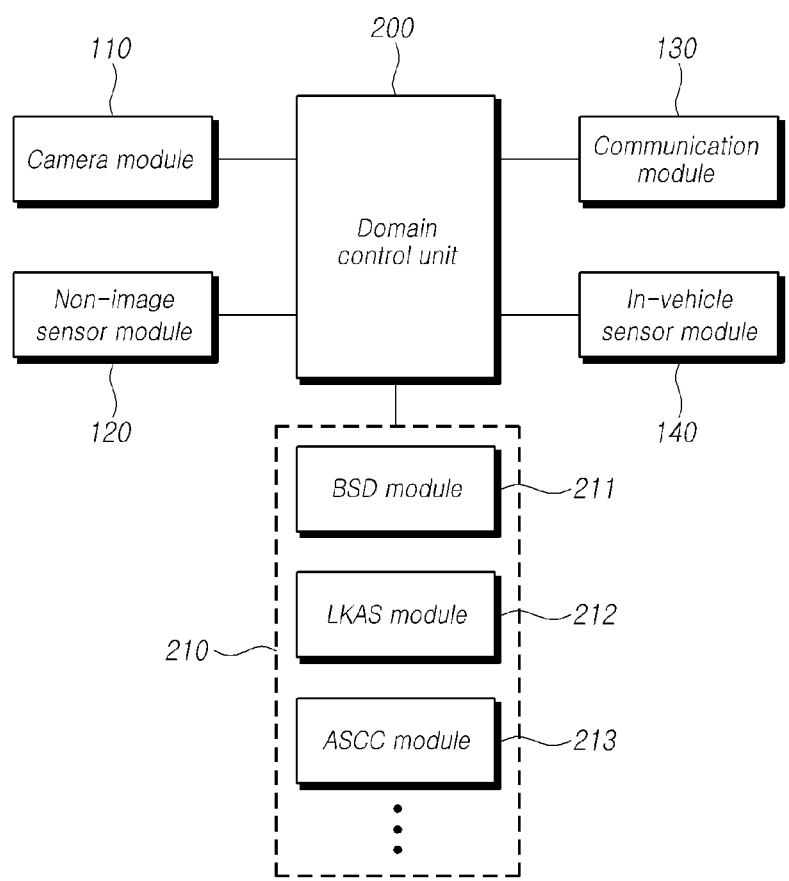
FIG. 2 is a block diagram of a vehicle according to another embodiment.

FIG. 2 is a block diagram of a vehicle according to another embodiment.

Referring to FIG. 2, the vehicle may be configured to include at least one of the camera module 110, the non-image sensor modules 120, the communication module 130, and the in-vehicle sensor module 140 described above. The description thereof has been made with reference to FIG. 1, which will be omitted below.

In addition, the vehicle may include a domain control unit 200.

The domain control unit (DCU) 200 may be configured to: receive the captured image data from at least one image sensor; receive the captured sensing data from a plurality of non-image sensors; and process at least one piece of the image data and the sensing data. To this end, the domain control unit 200 may include at least one processor.

Alternatively, the domain control unit 200 may transmit and receive data to and from at least one of the camera module 110, the non-image sensor module 120, the communication module 130, the in-vehicle sensor module 140, and a driver assistance system module 210, thereby processing data received therethrough. That is, the domain control unit 200 may be provided inside the vehicle, and may communicate with at least one module mounted in the vehicle. To this end, the domain control unit 200 may further include an appropriate data link or communication link, such as a vehicle network bus, for data transmission or signal communication.

The domain control unit 200 may operate to control one or more of the various driver assistance systems (DAS) used in the vehicle. For example, the domain control unit 200 may determine a certain situation, a condition, occurrence of an event, control operation, or the like, based on data obtained from at least one of the modules 110, 120, 130, 140, and 210 described above.

The domain control unit 200, using the determined information or the like, may transmit signals for controlling the operations of various driver assistance system modules 210 provided inside the vehicle. For example, the driver assistance system module 210 may include a blind-spot detection (BSD) system module 211, a lane-keeping assistance system (LKAS) module 212, an adaptive smart cruise control (ASCC) system module 213, and the like. In addition, the driver assistance system module 210 of the vehicle may be variously configured with, for example, a lane departure warning system (LDWS), a lane change assistance system (LCAS), a parking assistance system (PAS), and the like. The terms and names of the driver assistance systems described herein are illustrative, and the driver assistance systems are not limited thereto. In addition, the driver assistance system module 210 may include an autonomous driving module for autonomous driving. Alternatively, the domain control unit may perform control such that the vehicle performs the autonomous driving through the control of the individual system modules included in the driver assistance system module 210.

Figure 3:
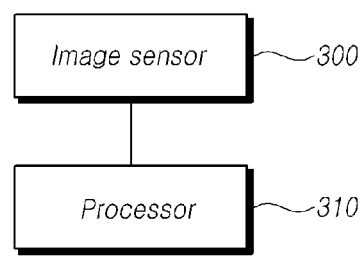
FIG. 3 is a block diagram explaining a camera module provided in a vehicle.

FIG. 3 is a block diagram explaining a camera module provided in a vehicle.

Referring to FIG. 3, the camera module 110 may include an image sensor 300 and a processor 310.

The image sensor 300 may refer to a device that converts light (image information) incident through camera lenses into an electric digital signal. For example, the image sensor 300 may refer to a Charge Coupled Device (CCD) image sensor that directly transmits an electronic signal. Alternatively, the image sensor 300 may refer to a Complementary Metal Oxide Semiconductor (CMOS) image sensor that converts a signal into a voltage, thereby transmitting the same.

As described above, the image sensor 300 may be disposed on the vehicle so as to have a field of view of the exterior or interior of the vehicle, and one or more image sensors 300 may be mounted in respective portions of the vehicle so as to have fields of view of the front area, the side area, or the rear area of the vehicle.

The image data captured by the image sensor 300 may be generated in a format of, for example, AVI, MPEG 4, H.264, DivX, or JPEG in a raw form. The image data captured by the image sensor 300 may be processed by the processor 310.

The processor 310 may operate to process the image data captured by the image sensor 300. For example, the operation of processing the image data may be handled by a processor included in the camera module. As another example, the image data may be processed by the controller 100 or the domain control unit 200 described above.

For example, the processor 310 may process data read by the image sensor 300 into a high quality image through various operations. The processor 310 may process image data to perform operations of target detection, distance measurement, target classification, and the like, as necessary.

The terms and exemplary description of the respective elements mentioned above are intended for convenience of understanding, and the present disclosure is not limited thereto. The above-described terms may be modified in the following description in order to more clearly illustrate embodiments according to the present disclosure. The configuration of the vehicle described with reference to FIGS. 1 to 3 is only an exemplary illustration, and hereinafter, the configuration may be modified, added, or omitted in order to more clearly explain the technical concept of the present disclosure.

A vehicle employing an autonomous driving function must identify the exact position of the vehicle during autonomous driving. The vehicle generally identifies the position of the vehicle using GPS information recognized by a GPS sensor in the vehicle. Alternatively, the vehicle compensates for a GPS-based vehicle position using a camera (i.e., a front camera) that takes a photograph in the driving direction of the vehicle in order to reduce GPS noise.

However, in the case where the position of the vehicle is determined using the front camera to compensate for the GPS noise, an error in compensating for the position becomes higher due to irrecognition or erroneous recognition of road-lines in the multi-angled curved section or in the section where the lane width changes because of the limitation of the angle of view of the front camera.

For example, in the case of using only the front camera of the vehicle, the front camera of the vehicle, in a multi-angled curved section, often recognizes only the right front road-line, rather than the left front road-line, of a driving lane due to the narrow angle of view of the camera. That is, not all of the left and right front road-lines of the driving lane are detected. Accordingly, the vehicle cannot accurately recognize front road-lines of the driving lane, so that the accuracy of the road-line offset is degraded. In particular, as the high curvature road is long, the number of times of road-line irrecognition increases, so that the error in the vehicle positioning is accumulated.

As another example, if the width of the driving lane changes due to a toll gate entry or exit, intersection entry, road alteration, or the like, the vehicle may erroneously recognize the road-lines due to a change in the width of the driving lane. This degrades the effect of compensating for the position of the vehicle by correcting the GPS noise.

The present disclosure provides a system of compensating for the position of a vehicle, which recognizes front and rear road-lines of a driving lane of the vehicle using at least front and rear cameras of the vehicle, determines a road-line offset of the vehicle using the offsets of the recognized front and rear road-lines, and compensates for the position of the vehicle using the determined road-line offset. According to the system of compensating for the position of a vehicle of the present disclosure, it is possible to increase the accuracy of the road-line offset in a multi-angled curved section or in a section where the lane width changes, thereby precisely compensating for the position of the vehicle. As a result, the driving stability of the vehicle can be improved. Hereinafter, a system of compensating for the position of a vehicle of the present disclosure will be described in detail with reference to various embodiments.

FIG. 4 is a diagram illustrating configuration of a controller of a system of compensating for the position of a vehicle according to an embodiment of the present disclosure.

A controller 100 included in the system of compensating for the position of a vehicle of the present disclosure may include at least one memory and at least one processor programmed to perform various tasks of the controller. The processor may perform various functions of following modules 410, 420, 430 and 440. The modules 410, 420, 430 and 440 are implemented with software instructions executed on the processor. The controller 100 includes: a road-line detector 410 that, based on image data on the front and rear areas of the vehicle, which is processed by one or more camera modules, detects a front road-line and a rear road-line of a driving lane of the vehicle; a road-line offset calculator 420 that, based on the front road-line and the rear road-line of the driving lane, determines an offset of the front road-line and an offset of the rear road-line; a road-line offset comparator 430 that compares the offset of the front road-line with the offset of the rear road-line; and a final road-line offset determiner 440 that, based on the result of the comparison, determines a final road-line offset of the vehicle.

Referring to FIG. 4, in an embodiment, the road-line detector 410, based on image data captured and processed by one or more camera modules located in the front and rear portions of the vehicle, may detect road-lines of a lane in which the vehicle is traveling. In another embodiment, in the case where the system of compensating for the position of a vehicle includes one or more non-image sensor modules, the road-line detector 410, based on at least one piece of image data captured and processed by one or more camera modules located in the front and rear portions of the vehicle and sensing data captured and processed by one or more non-image sensor modules located at the front and rear of the vehicle, may detect road-lines of a lane in which the vehicle is traveling.

The road-line detector 410, based on data recognized by the vehicle, may detect a front road-line of a driving lane in front of the vehicle and a rear road-line of the driving lane. The detected front road-lines of the driving lane may include a right front road-line and a left front road-line in front of the driving lane, and the detected rear road-lines of the driving lane may include a right rear road-line and a left rear road-line behind the driving lane.

Ranges captured by the camera modules mounted in the front and rear portions of the vehicle will be described with reference to FIGS. 5 and 6. FIG. 5 is a view to explain ranges detected by camera modules mounted in a vehicle when the vehicle is located in a curved section, according to an embodiment of the present disclosure. FIG. 6 is a view to explain ranges detected by camera modules mounted in a vehicle when the vehicle is located in a section where the lane width thereof changes, according to another embodiment of the present disclosure.

A camera module mounted in the front portion of the vehicle supports long-distance recognition in order to implement a Lane-Keeping Assistance (LKA) function, an Adaptive Smart Cruise Control (ASCC) function, or the like, whereas it has a relatively narrow angle of view. On the other hand, a camera module mounted in the rear portion of the vehicle supports a wide angle of view to implement a parking assistance function or the like. Accordingly, even though the vehicle fails to recognize a part of front road-lines of the driving lane due to the narrow angle of view of the front camera in the curved section or the section where the lane is changed, the rear road-lines of the driving lane can be detected, thanks to a wide angle of view of the rear camera.

Figure 5A:
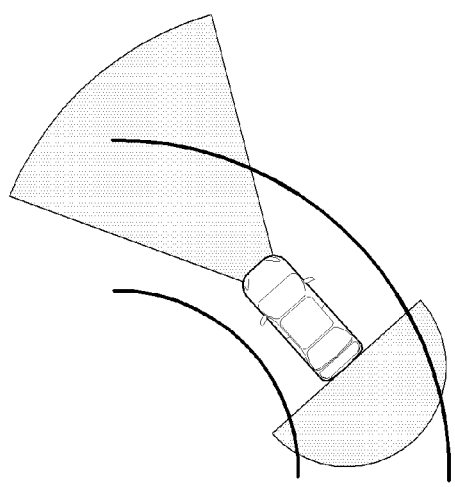
FIGS. 5A and 5B are views for explaining the range detected by a camera module mounted in a vehicle when the vehicle is located in a curved section according to an embodiment of the present disclosure.
Figure 5B:
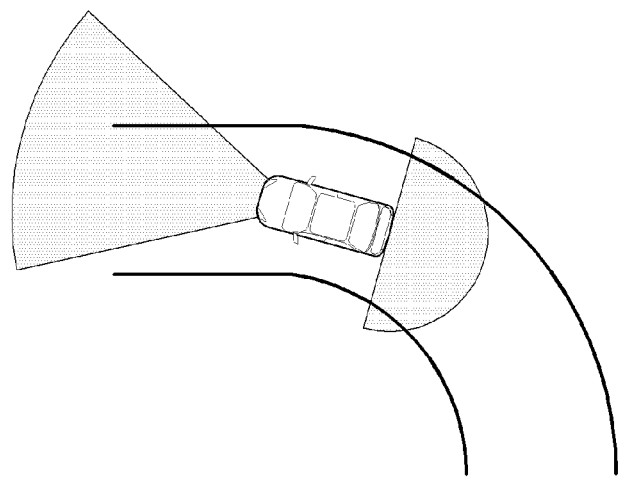
Figure 6:
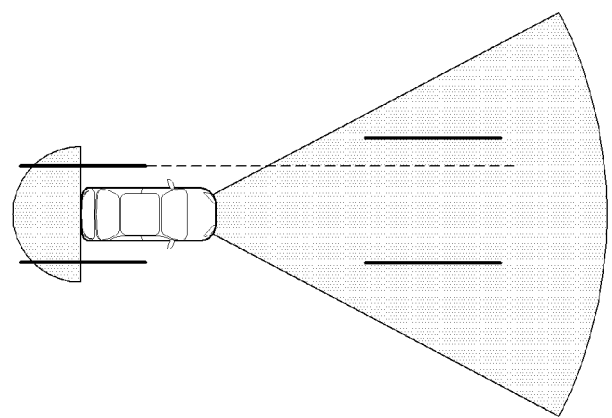
FIG. 6 is a view for explaining the range detected by a camera module mounted in a vehicle when the vehicle is located in a section where the lane width changes according to another embodiment of the present disclosure.

More specifically, referring to FIGS. 5A and 5B, the angle of the range detected by the camera module located in the front portion of the vehicle is smaller than the angle of the range detected by the camera module located in the rear portion of the vehicle. Accordingly, as shown in FIG. 5A, when the vehicle is located in the curved section, a right front road-line, among the front road-lines of the driving lane, may be detected by the front camera module, whereas a left front road-line, among the front road-lines, may not be detected by the front camera module. On the other hand, since the rear camera module of the vehicle has an angle of view of 180 degrees, both the right rear road-line and the left rear road-line of the driving lane can be detected even when the vehicle is located in the curved section. As shown in FIG. 5B, even when no left front road-line of the driving lane continues to be recognized while the vehicle is travelling in the curved section, both the left and right rear road-lines of the driving lane can be detected. Further, as shown in FIG. 6, when the vehicle is located in a lane width change section due to toll gate entry or exit, intersection entry, road alteration, or the like, the system of compensating for the position of a vehicle detects the right front road-line and the left front road-line of the vehicle by the front camera module of the vehicle and detects the right rear road-line and the left rear road-line of the vehicle by the rear camera module of the vehicle. The system of compensating for the position of a vehicle, based on the detected front and rear road-lines, may determine that the width of the lane, in which the vehicle is traveling, is changed.

The camera module or non-image sensor mounted in the vehicle may capture image data or sensing data periodically at an interval of a predetermined time or in real time, and the road-line detector 410, based on the data processed periodically or in real time, may detect the road-lines.

A method in which the road-line detector 410 detects the road-lines based on the image data or the sensing data may be a conventionally well-known road-line detection method, and since a specific method of detecting the road-lines from the data recognized by the vehicle can be implemented by those skilled in the art using conventional knowledge, a detailed description thereof will be omitted in the present specification.

The road-line offset calculator 420 of the present disclosure, based on the front road-lines and the rear road-lines of the driving lane, determines offsets for the front road-lines and offsets for the rear road-lines.

Figure 7:
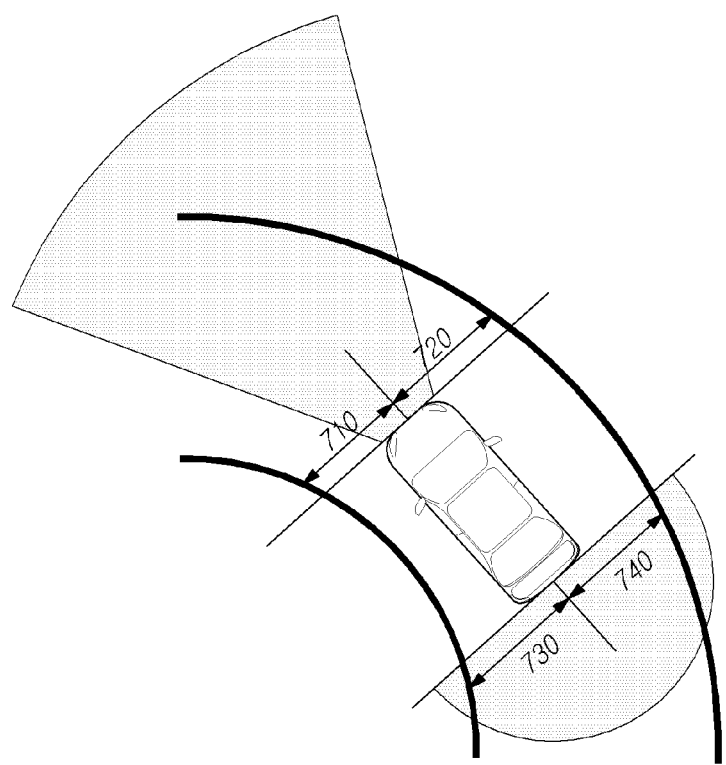
FIG. 7 is a view for explaining road-line offsets determined by a system of compensating for a position of a vehicle according to an embodiment of the present disclosure.

Road-line offsets of the vehicle will be described in detail with reference to FIG. 7. FIG. 7 is a view to explain road-line offsets determined by a system of compensating for the position of a vehicle according to an embodiment of the present disclosure.

In an embodiment, the road-line offset indicates the lateral distance between a road-line of the driving lane and a longitudinal central axis of the vehicle. Here, the "longitudinal central axis of the vehicle" denotes a straight line which extends through the center of the width of the vehicle in the longitudinal direction (lengthwise direction) of the vehicle or in the direction in which the vehicle travels. The "lateral distance" means the distance to a vertical line in the lateral direction (widthwise direction) of the vehicle or in the direction in which the vehicle travels. In other words, the lateral distance between the road-line of the driving lane and the longitudinal central axis of the vehicle denotes the distance between a widthwise central axis of the vehicle, among the axes of the vehicle in the longitudinal direction (lengthwise direction), and the road-line of the driving lane in the lateral direction (widthwise direction) of the vehicle.

The road-line offset calculator determines the lateral distance between the detected front road-line of the driving lane and the longitudinal central axis of the vehicle, determines the lateral distance between the front road-line and the longitudinal central axis of the vehicle as an offset of the front road-line, and determines the lateral distance between the detected rear road-line of the driving lane and the longitudinal central axis of the vehicle, determines the lateral distance between the rear road-line and the longitudinal central axis of the vehicle as an offset of the rear road-line.

In an embodiment, the road-line offset calculator may determine the lateral distance 710 between the left front road-line of the driving lane and the longitudinal central axis of the vehicle, and set the lateral distance 710 as an offset of the left front road-line of the vehicle. The road-line offset calculator may determine the lateral distance 720 between the right front road-line of the driving lane and the longitudinal central axis of the vehicle, and set the lateral distance 720 as an offset of the right front road-line of the vehicle. The road-line offset calculator may determine the lateral distance 730 between the left rear road-line of the driving lane and the longitudinal central axis of the vehicle, and set the lateral distance 730 the same as an offset of the left rear road-line of the vehicle. The road-line offset calculator may determine the lateral distance 740 between the right rear road-line of the driving lane and the longitudinal central axis of the vehicle, and set the lateral distance 740 as an offset right rear road-line of the vehicle.

In another embodiment, the road-line offset indicates the minimum lateral distance between the road-line of the driving lane and the vehicle. The road-line offset calculator may determine the minimum lateral distance between the left front road-line of the driving lane and an end portion of the vehicle, which is closest to the left front road-line, determine the same as an offset of the left front road-line of the vehicle, may determine the minimum lateral distance between the right front road-line of the driving lane and an end portion of the vehicle, which is closest to the right front road-line, determine the same as an offset of the right front road-line, may determine the minimum lateral distance between the left rear road-line of the driving lane and an end portion of the vehicle, which is closest to the left rear road-line, determine the same as an offset of the left rear road-line, and may determine the minimum lateral distance between the right rear road-line of the driving lane and an end portion of the vehicle, which is closest to the right rear front road-line, determine the same as an offset of the right rear road-line.

Referring back to FIG. 4 for explaining elements included in the controller, the road-line offset comparator 430 compares the offset of the front road-line with the offset of the rear road-line, and the final road-line offset determiner 440 determines a final road-line offset of the vehicle according to the result of the comparison.

More specifically, the road-line offset comparator 430 may compare the offset of the left front road-line with the offset of the left rear road-line thereof of the vehicle, and may compare the offset of the right front road-line with the offset of the right rear road-line thereof of the vehicle.

In an embodiment, when the difference between the offset of the front road-line and the offset of the rear road-line is greater than a predetermined threshold value, the final road-line offset determiner 440 may set the offset of the rear road-line as a final road-line offset of the vehicle. When the difference between the offset of the front road-line and the offset of the rear road-line is not greater than the predetermined threshold value, the final road-line offset determiner 440 may set the offset of the front road-line as the final road-line offset of the vehicle. Here, the predetermined threshold value may be a value set in advance according to the curvature of the driving lane.

In an embodiment, when the road-line detector 410 fails to detect either the front road-line or the rear road-line of the driving lane, the final road-line offset determiner 440 sets the offset of the detected road-line among the front road-line and the rear road-line as the final road-line offset of the vehicle.

In another embodiment, when the road-line detector 410 fails to detect either the front road-line or the rear road-line of the driving lane, the road-line offset calculator 420 determines that the offset of the undetected road-line, which is not detected by the road-line detector, is a previously determined offset for the undetected road-line, and the final road-line offset determiner 440, based on the previously determined offset of the undetected road-line, which is not detected by the road-line detector, and the offset of the detected road-line among the front road-line and the rear road-line, determines the final road-line offset of the vehicle. When calculating the final road-line offset of the vehicle, the weight for the offset of the detected road-line is greater than the weight of the previously determined offset of the undetected road-line.

More specifically, in the case where the road-line detector 410 periodically detects the road-lines, when it is determined that any one of the front road-line and the rear road-line of the driving lane is not detected, the road-line offset calculator 420 may determine that the offset of the undetected road-line is the offset determined just before the corresponding time period for the road-line. The final road-line offset determiner 440, based on the previous determined offset of the undetected road-line and the offset of the detected road-line, determines the final road-line offset of the vehicle. In this case, since the value of the old offset of the road-line is used for the offset of the undetected road-line, the weight in calculating the final road-line offset is set to be lower than the weight of the offset of the detected road-line.

In an embodiment, when the road-line detector 410 continuously fails to detect either the front road-line or the rear road-line of the driving lane, the final road-line offset determiner 440 sets the offset of the detected road-line as the final road-line offset of the vehicle.

More specifically, when the number of times the road-line detector 410 fails to detect either the front road-line or the rear road-line of the driving lane exceeds a predetermined number, the offset of the detected road-line is immediately determined as the final road-line offset, instead of using the offset of the undetected road-line.

In an embodiment, when the road-line detector 410 detects both the front road-line and the rear road-line of the driving lane, when the difference between the offset of the front road-line and the offset of the rear road-line is greater than a predetermined threshold value, the final road-line offset determiner 440 may determine the average road-line offset of the offset of the front road-line and the offset of the rear road-line as the final road-line offset of the vehicle. When the difference between the offset of the front road-line and the offset of the rear road-line is not greater than the predetermined threshold value, the final road-line offset determiner 440 may set the offset of the front road-line as the final road-line offset of the vehicle.

Figure 8:
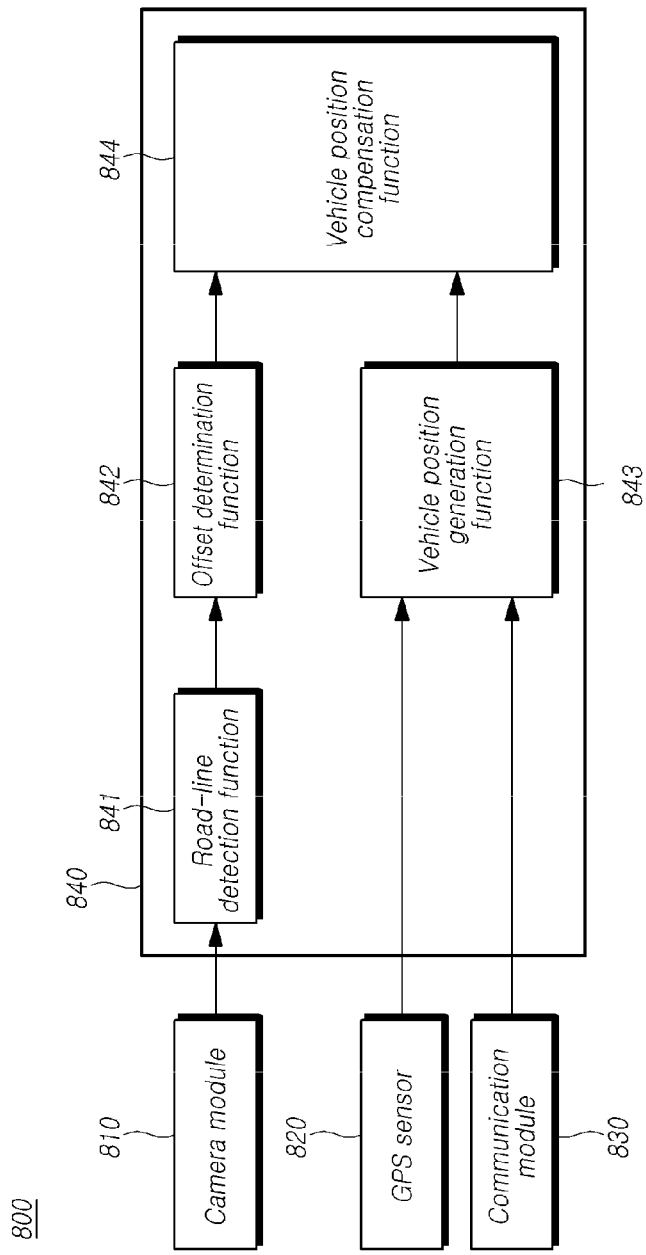
FIG. 8 is a diagram illustrating configuration of a system of compensating for a position of a vehicle according to an embodiment of the present disclosure.

In an embodiment, based on the final road-line offset of the vehicle, positional information on the vehicle recognized by a GPS sensor, and information on the road on which the vehicle is located, the controller compensates for the position of the vehicle. In this regard, FIG. 8 illustrates a relationship of a camera module 810, a GPS sensor 820, a communication module 830, and a controller 840 of a system 800 of compensating for the position of a vehicle.

The system 800 of compensating for the position of a vehicle includes a camera module 810, a GPS sensor 820, a communication module 830, and a controller 840. The description of the camera module illustrated in FIGS. 1 and 2 above may be applied to the camera module 810. The controller 840 receives data including information on the environment around the vehicle from the camera module 810 and performs a road-line detection function 841 for detecting road-lines based on the data. Then, the controller 84, based on the detected road-lines, performs an offset determination function 842 for calculating road-line offsets. The GPS sensor 820 may obtain the position of a vehicle using signals transmitted from GPS satellites. The communication module 830 performs functions for communication between a vehicle and a vehicle, a vehicle and an infrastructure, a vehicle and a server, and components inside the vehicle. More specifically, the communication module may receive, from a road management server, information on the road on which the vehicle is traveling. The controller 840 performs a vehicle position generation function 843 for generating the position of a vehicle based on the position information on the vehicle and the road information, which are received from the GPS sensor 820 and the communication module 830. In another embodiment, the road information may be extracted from the image data and/or the sensing data captured by the camera module and/or the non-image sensor module, which are mounted in the vehicle, and the controller may perform a vehicle position generation function 843 based on the extracted road information and the position information on the vehicle recognized by the GPS sensor. The controller 840 performs a vehicle position compensation function 844 for compensating for the generated position of the vehicle using the determined road-line offset. When the road-line offset determined for the front and rear areas of the vehicle is applied to the position of the vehicle generated based on the information received from the GPS sensor and the communication module, it is possible to precisely determine the position of the vehicle on the road (in particular, the position of the vehicle with respect to the road-lines of the driving lane), thereby improving driving stability.

A method of compensating for the position of a vehicle according to the present disclosure includes: a road-line detection step of detecting a front road-line and a rear road-line of a driving lane of the vehicle; a road-line offset calculation step of calculating an offset of the front road-line and an offset of the rear road-line, based on the front road-line and the rear road-line of the driving lane; a road-line offset comparison step of comparing the offset of the front road-line with the offset of the rear road-line; and a final road-line offset determination step of determining a final road-line offset of the vehicle based on the result of the comparison.

Figure 9:
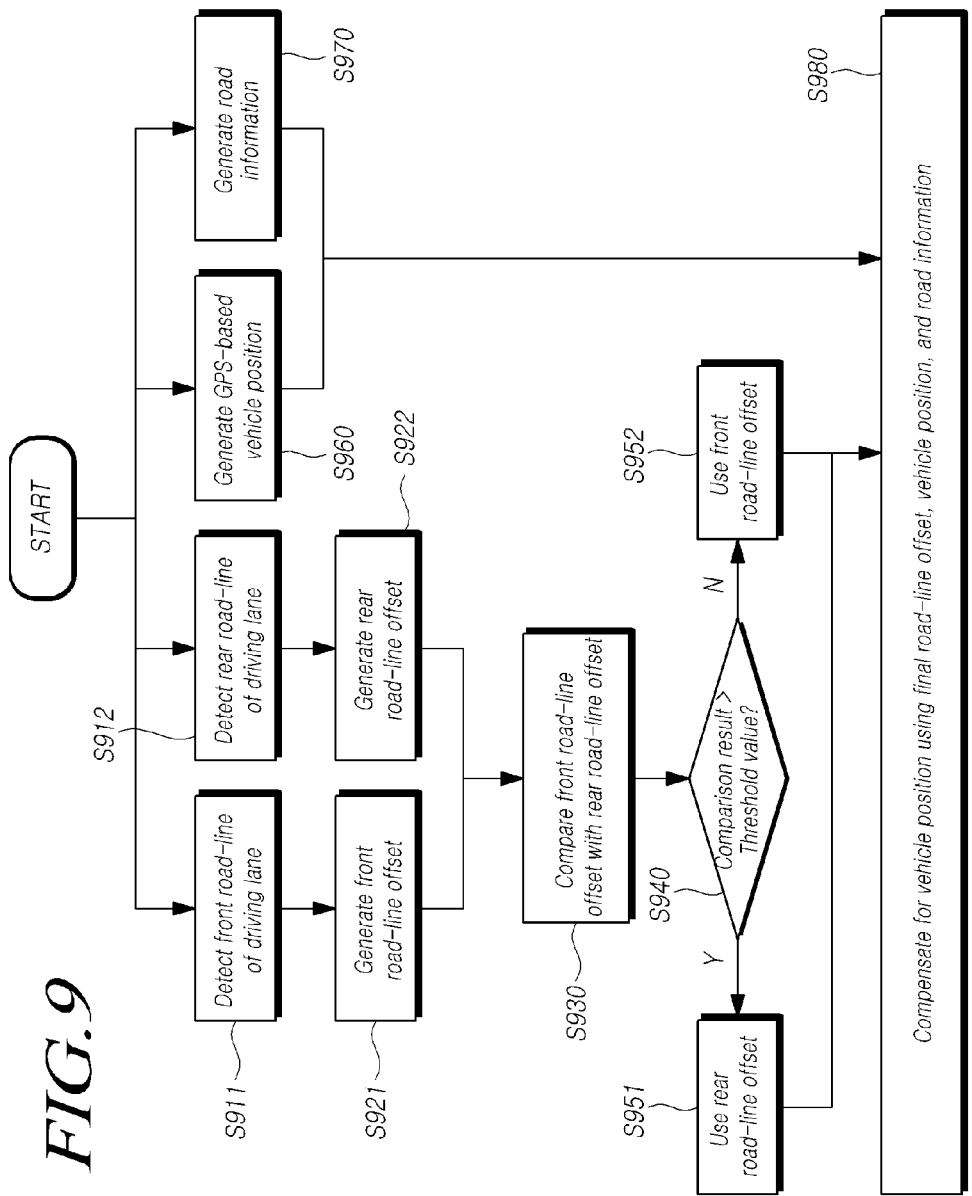
FIG. 9 is a flowchart illustrating a method of compensating for a position of a vehicle according to an embodiment of the present disclosure.
Figure 10:
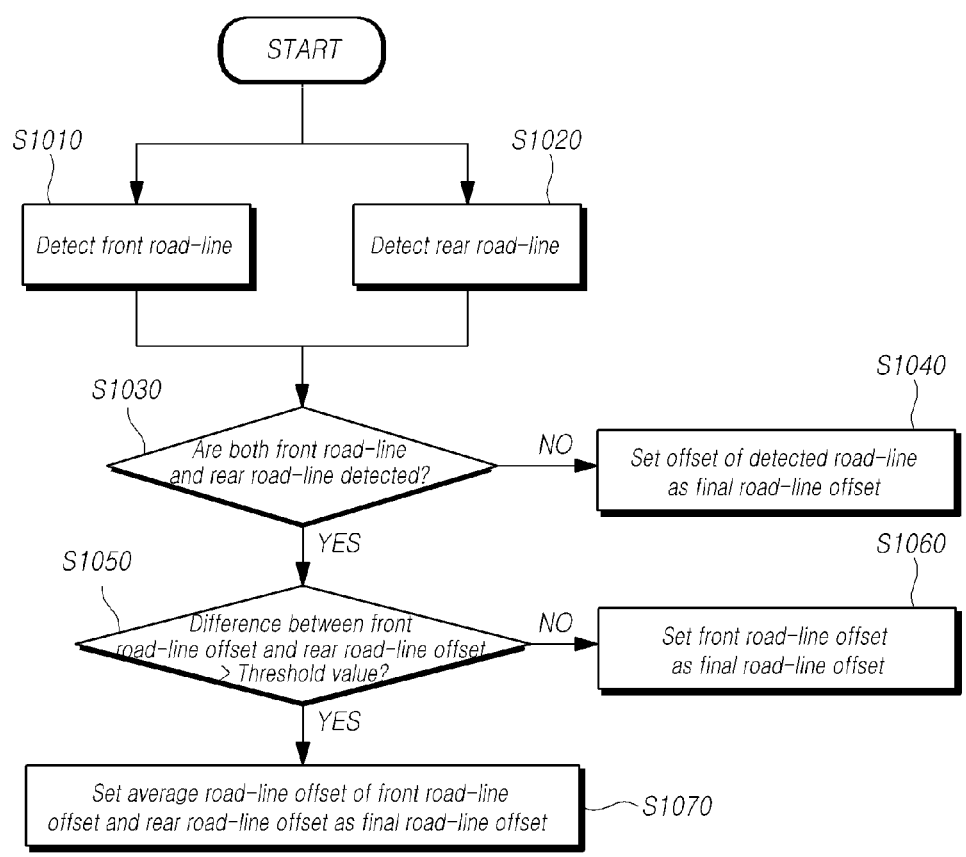
FIG. 10 is a flowchart illustrating a method of compensating for a position of a vehicle according to another embodiment of the present disclosure.
Figure 11:
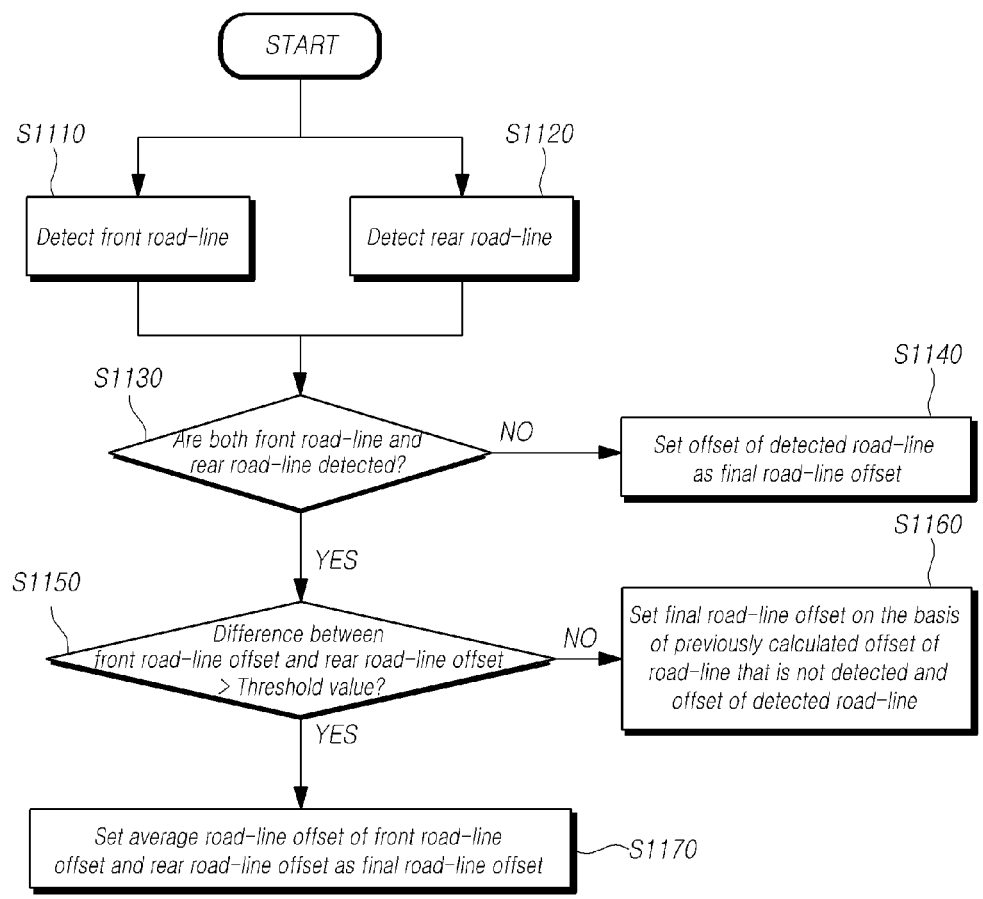
FIG. 11 is a flowchart illustrating a method of compensating for a position of a vehicle according to another embodiment of the present disclosure.

FIGS. 9 to 11 are flowcharts illustrating a method of compensating for the position of a vehicle according to an embodiment of the present disclosure. These figures correspond to a flowchart of the functions performed in the system of compensating for the position of a vehicle as described above. Therefore, the following description of the flowchart of a method of compensating for the position of a vehicle can be applied to a system of compensating for the position of a vehicle.

The description of the road-line detection step, the road-line offset calculation step, the road-line offset comparison step, and the final road-line offset determination step, which are included in the method of compensating for the position of a vehicle according to the present disclosure, may refer to the description of the road-line detector, the road-line offset calculator, the road-line offset comparator, and the final road-line offset determiner, which are included in the controller of the system of compensating for the position of a vehicle in FIG. 4.

FIG. 9 is a flowchart illustrating a method of compensating for the position of a vehicle according to an embodiment of the present disclosure. The system of compensating for the position of a vehicle, based on image data and/or sensing data captured and processed by a camera module and/or a non-image sensor module, detects a front road-line and a rear road-line of a driving lane (S911 and S912). In addition, the system of compensating for the position of a vehicle determines the lateral distances between the detected front and rear road-lines and the longitudinal central axis of the vehicle, thereby generating an offset of the front road-line and an offset of the rear road-line (S921 and S922). The system of compensating for the position of a vehicle compares the generated offset of the front road-line with the offset of the rear road-line (S930). The system of compensating for the position of a vehicle may determine an absolute value of the difference between the offset of the front road-line and the offset of the rear road-line as a result of the comparison. The system of compensating for the position of a vehicle determines whether or not the comparison result of the offset of the front road-line and the offset of the rear road-line is greater than a predetermined threshold value (S940). When the comparison result of the offset of the front road-line and the offset of the rear road-line is greater than the predetermined threshold value, the system of compensating for the position of a vehicle sets the offset of the rear road-line as the final road-line offset (S951). On the other hand, when the comparison result of the offset of the front road-line and the offset of the rear road-line is not greater than the predetermined threshold value, the system of compensating for the position of a vehicle sets the offset of the front road-line as the final road-line offset (S952). The system of compensating for the position of a vehicle generates the position of a vehicle using a GPS sensor (S960). The system of compensating for the position of a vehicle generates road information (S970). The system of compensating for the position of a vehicle may receive, from a server managing the road on which the vehicle is traveling or a navigation system, information on the road on which the vehicle is traveling, thereby determining road information. The system of compensating for the position of a vehicle compensates for the position of the vehicle using the final road-line offset, the vehicle position information, and the road information, which are determined as described above (S980).

FIG. 10 is a flowchart illustrating a method of compensating for the position of a vehicle according to another embodiment of the present disclosure. In the present embodiment, a system of compensating for the position of a vehicle, based on image data and/or sensing data captured and processed by a camera module and/or a non-image sensor module, detects a front road-line and a rear road-line of a driving lane (S1010 and S1020). The system of compensating for the position of a vehicle determines whether or not both the front road-line and the rear road-line of the driving lane are detected (S1030). When it is determined that either the front road-line or the rear road-line of the driving lane is not detected, the system of compensating for the position of a vehicle determines an offset of the detected road-line and sets the offset of the detected road-line as the final road-line offset (S1040). When it is determined that both the front road-line and the rear road-line of the driving lane are detected, the system of compensating for the position of a vehicle determines an offset of the front road-line and an offset of the rear road-line and compares the offset of the front road-line with the offset of the rear road-line, thereby determining whether or not the difference therebetween is greater than a predetermined threshold value (S1050). When it is determined that the difference between the offset of the front road-line and the offset of the rear road-line is not greater than the threshold value, the system of compensating for the position of a vehicle sets the offset of the front road-line as the final road-line offset (S1060). In other words, when it is determined that the difference between the offset of the front road-line and the offset of the rear road-line is not greater than the threshold value, the offset of the front road-line has a weight of 1, and the offset of the rear road-line is not considered in determining the final road-line offset. On the other hand, when it is determined that the difference between the offset of the front road-line and the offset of the rear road-line is greater than the threshold value, the system of compensating for the position of a vehicle sets the average road-line offset of the offset of the front road-line and the offset of the rear road-line as the final road-line offset (S1070). In other words, when it is determined that the difference between the offset of the front road-line and the offset of the rear road-line is greater than the threshold value, the offset of the front road-line and offset of the rear road-line have weights of 0.5, respectively.

FIG. 11 is a flowchart illustrating a method of compensating for the position of a vehicle according to another embodiment of the present disclosure. Steps S1110, S1120, S1130, S1140, S1150, and S1170 in FIG. 11 may refer to steps S1010, S1020, S1030, S1040, S1050, and S1070 in FIG. 10. In FIG. 11, when it is determined that the difference between the offset of the front road-line and the offset of the rear road-line is not greater than a threshold value, the offset previously determined for the undetected road-line is used as the offset of the undetected road-line. The step of detecting the road-lines may be performed periodically or in real time, and the step of calculating the offsets for the detected road-lines may also be performed periodically or in real time. When it is determined that the difference between the offset of the front road-line and the offset of the rear road-line is not greater than the threshold value, the system of compensating for the position of a vehicle, based on the offset previously determined for the undetected road-line and the offset of the detected road-line, determines the final road-line offset (S1160). When calculating the final road-line offset of the vehicle, the weight for the offset of the detected road-line is greater than the weight of the previously determined offset of the undetected road-line.

When either the offset of the front road-line or the offset of the rear road-line on the driving lane is not continuously detected in the road-line detection step, the offset of the detected road-line is set as the final road-line offset of the vehicle in the final road-line offset determination step.

The camera module of the present disclosure includes an image sensor disposed on a vehicle so as to have a field of view of the interior or exterior of the vehicle and configured to capture image data and a processor configured to process the image data captured by the image sensor. The image data captured by the image sensor is used to detect the front road-line and the rear road-line of the driving lane. In addition, based on the detected front road-line and rear road-line of the driving lane, the offset of the front road-line and the offset of the rear road-line are determined. Then, the determined offset of the front road-line and offset of the rear road-line are compared with each other, and the final road-line offset of the vehicle may be determined according to the result of the comparison. The description of the system of compensating for the position of a vehicle described above may be applied to the detailed method of detecting the front road-line and the rear road-line of the driving lane using the image data, calculating the offset of each road-line, determining the final road-line offset based on the same, and compensating for the position of a vehicle using the final road-line offset, the vehicle position information, and the road information.

The above-described embodiments may be implemented by various means. For example, the embodiments may be implemented by hardware, firmware, software, or a combination thereof.

In the case of the implementation of hardware, the present embodiments may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In the case of the implementation of firmware or software, the present embodiments may be implemented in the form of an apparatus, a procedure, or a function for performing the functions or operations described above. Software code may be stored in a memory unit and driven by a processor. The memory unit may be located inside or outside the processor, and may exchange data with the processor by various well-known means.

In addition, terms "system", "processor", "controller", "component", "module", "interface", "model", "unit", or the like may generally mean computer-related entity hardware, a combination of hardware and software, software, or running software. For example, the above-described elements may be a process driven by a processor, a processor, a controller, a control processor, an entity, an execution thread, a program and/or a computer, but they are not limited thereto. For example, an application running in a controller or a processor, the controller, or the processor may be included in the elements. One or more elements may be provided in a process and/or execution thread, and the elements may be provided in one system, or may be distributed to two or more systems.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure. The above embodiments of the present disclosure have been described only for illustrative purposes, and those skilled in the art will appreciate that various modifications and changes may be made thereto without departing from the scope and spirit of the disclosure. The scope of the present disclosure shall be construed based on the accompanying claims in such a manner that all of the technical ideas included within the scope equivalent to the claims belong to the present disclosure.

What is claimed is:

1. A system of compensating for a position of a vehicle, the system comprising:
one or more image acquisition devices disposed on the vehicle so as to have fields of view of a front area and a rear area of the vehicle, respectively, and configured to capture image data and process the captured image data; and a controller configured to perform control at least based on the processed image data, wherein the controller is further configured to:

detect a front road-line and a rear road-line of a driving lane of the vehicle based on the image data of the front and rear areas of the vehicle, which is processed by the one or more image acquisition devices, determine an offset of the front road-line and an offset of the rear road-line, compare the offset of the front road-line with the offset of the rear road-line, set the offset of the rear road-line as a final road-line offset of the vehicle when the difference between the offset of the front road-line and the offset of the rear road-line is greater than the predetermined threshold value, set the offset of the front road-line as the final road-line offset of the vehicle when the difference between the offset of the front road-line and the offset of the rear road-line is less than or equal to the predetermined threshold value, and perform a compensation control for the position of the vehicle at least based on the determined final road-line offset.

2. The system of claim 1, wherein the controller is further configured to:

determine a front lateral distance between the detected front road-line and a longitudinal central axis of the vehicle, determine the front lateral distance as the offset of the front road-line, determine a rear lateral distance between the detected rear road-line and the longitudinal central axis of the vehicle, and determine the rear lateral distance as the offset of the rear road-line.

3. The system of claim 1, wherein the controller is further configured to set an offset of a detected road-line among the front road-line and the rear road-line as the final road-line offset of the vehicle when either the front road-line or the rear road-line of the driving lane is not detected.

4. The system of claim 3, wherein the controller is further configured to set the offset of the detected road-line as the final road-line offset when the number of times either the front road-line or the rear road-line of the driving lane is not detected exceeds a predetermined number.

5. The system of claim 1, wherein the controller is further configured to:

when either the front road-line or the rear road-line of the driving lane is not detected, determine that an offset of an undetected road-line is a previously determined offset of the undetected road-line, and determines the final road-line offset based on the previously determined offset of the undetected road-line and an offset of a detected road-line among the front road-line and the rear road-line, and wherein, when determining the final road-line offset of the vehicle, a weight for the offset of the detected road-line is greater than a weight for the previously determined offset of the undetected road-line.

6. The system of claim 5, wherein the controller is further configured to set the offset of the detected road-line as the final road-line offset of the vehicle when either the front road-line or the rear road-line is not detected continuously.

7. The system of claim 1, wherein the controller is further configured to:

set an average of the offset of the front road-line and the offset of the rear road-line as the final road-line offset of the vehicle when both the front road-line and the rear road-line are detected and the difference between the offset of the front road-line and the offset of the rear road-line is greater than a predetermined threshold value, and set the offset of the front road-line as the final road-line offset of the vehicle when both the front road-line and the rear road-line are detected and the difference between the offset of the front road-line and the offset of the rear road-line is less than or equal to the predetermined threshold value.

8. The system of claim 1, wherein the controller is further configured to compensate for the position of the vehicle based on the final road-line offset of the vehicle, positional information on the vehicle recognized by a GPS sensor, and information on a road on which the vehicle is located.

9. The system of claim 1, wherein the one or more image acquisition devices are further configured to capture image data of a side area of the vehicle.

10. A vehicle including the system of claim 1.

11. A system of compensating for a position of a vehicle, the system comprising:

one or more image acquisition devices disposed on the vehicle so as to have fields of view of a front area and a rear area of the vehicle, respectively, and configured to capture image data and process the captured image data;

one or more non-image acquisition devices disposed on the vehicle for sensing an exterior of the vehicle and configured to capture sensing data and process the captured sensing data; and a controller comprising one or more processors configured to, at least based on the processed image data and the sensing data, perform control, wherein the controller is configured to:

detect a front road-line and a rear road-line of a driving lane of the vehicle based on at least one of the image data of the front and rear areas of the vehicle, which is processed by the one or more image acquisition devices, or the sensing data, which is processed by the one or more non-image acquisition devices, determine an offset of the front road-line and an offset of the rear road-line, compare the offset of the front road-line with the offset of the rear road-line, set the offset of the rear road-line as a final road-line offset of the vehicle when the difference between the offset of the front road-line and the offset of the rear road-line is greater than the predetermined threshold value, set the offset of the front road-line as the final road-line offset of the vehicle when the difference between the offset of the front road-line and the offset of the rear road-line is less than or equal to the predetermined threshold value, and perform a compensation control for the position of the vehicle at least based on the determined final road-line offset.

12. The system of claim 11, wherein the controller is configured to compensate for the position of the vehicle based on the final road-line offset of the vehicle, positional information on the vehicle recognized by a GPS sensor, and information on a road on which the vehicle is located.

13. A method of compensating for a position of a vehicle, the method comprising:
- detecting a front road-line and a rear road-line of a driving lane of the vehicle;
- determining an offset of the front road-line and an offset of the rear road-line;
- comparing the offset of the front road-line with the offset of the rear road-line;
- determining a final road-line offset of the vehicle according to a comparison result; and
- performing a compensation control for the position of the vehicle at least based on the determined final road-line offset,
- wherein the determining a final road-line offset comprises:
  - setting the offset of the rear road-line as a final road-line offset of the vehicle when the difference between the offset of the front road-line and the offset of the rear road-line is greater than a predetermined threshold value; and
  - setting the offset of the front road-line as the final road-line offset of the vehicle when the difference between the offset of the front road-line and the offset of the rear road-line is less than or equal to the predetermined threshold value.

14. The method of claim 13, wherein the determining an offset comprises:
- determining a front lateral distance between the detected front road-line and a longitudinal central axis of the vehicle;
- determining the front lateral distance between the front road-line and the longitudinal central axis of the vehicle as the offset of the front road-line;
- determining a rear lateral distance between the detected rear road-line of the driving lane and the longitudinal central axis of the vehicle; and
- determining the rear lateral distance between the rear road-line and the longitudinal central axis of the vehicle as the offset of the rear road-line.

15. The method of claim 13, wherein the determining a final road-line offset further comprises setting an offset of a detected road-line as the final road-line offset of the vehicle when either the front road-line or the rear road-line of the driving lane is not detected.

16. The method of claim 15, wherein the determining a final road-line offset further comprises setting the offset of a detected road-line as the final road-line offset of the vehicle when the number of times either the front road-line or the rear road-line of the driving lane is not detected exceeds a predetermined number.

17. The method of claim 13, wherein when either the front road-line or the rear road-line of the driving lane is not detected,
- the determining an offset comprises determining that an offset of an undetected road-line is a previously determined offset of the undetected road-line,
- the determining a final road-line offset comprises determining the final road-line offset based on the previously determined offset of the undetected road-line and an offset of a detected road-line among the front road-line and the rear road-line, and
- when determining the final road-line offset of the vehicle, a weight for the offset of the detected road-line is greater than a weight for the previously determined offset of the undetected road-line.

18. The method of claim 17, wherein the determining a final road-line offset further comprises setting the offset of the detected road-line as the final road-line offset of the vehicle when either the front road-line or the rear road-line is not continuously detected.

19. The method of claim 13, wherein the determining a final road-line offset further comprises:
- setting the average of the offset of the front road-line and the offset of the rear road-line as the final road-line offset of the vehicle when both the front road-line and the rear road-line are detected and the difference between the offset of the front road-line and the offset of the rear road-line is greater than a predetermined threshold value; and
- setting the offset of the front road-line as the final road-line offset of the vehicle when both the front road-line and the rear road-line are detected and a difference between the offset of the front road-line and the offset of the rear road-line is less than or equal to the predetermined threshold value.

20. The method of claim 13, further comprising compensating for a position of the vehicle, based on the final road-line offset of the vehicle, positional information on the vehicle recognized by a GPS sensor, and information on a road on which the vehicle is located.

21. A non-transitory computer-readable medium storing computer-executable instructions when executed by a processor, causing the processor to perform the method according to claim 13.

* * * * *